United States Patent
Nakamura

(10) Patent No.: US 11,002,048 B2
(45) Date of Patent: May 11, 2021

(54) HINGE DEVICE AND STORAGE PROVIDED WITH SAME

(71) Applicant: SHARP KABUSHIKI KAISHA, Sakai (JP)

(72) Inventor: Eisuke Nakamura, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 434 days.

(21) Appl. No.: 16/080,624

(22) PCT Filed: Feb. 24, 2017

(86) PCT No.: PCT/JP2017/007190
§ 371 (c)(1),
(2) Date: Aug. 28, 2018

(87) PCT Pub. No.: WO2017/203770
PCT Pub. Date: Nov. 30, 2017

(65) Prior Publication Data
US 2021/0095507 A1   Apr. 1, 2021

(30) Foreign Application Priority Data

May 26, 2016   (JP) .............................. JP2016-105005

(51) Int. Cl.
*E05D 7/081*   (2006.01)
*E05D 7/02*    (2006.01)
*E05D 3/04*    (2006.01)

(52) U.S. Cl.
CPC .............. *E05D 7/081* (2013.01); *E05D 3/04* (2013.01); *E05D 7/02* (2013.01); *F25D 2323/024* (2013.01)

(58) Field of Classification Search
CPC .. E05D 7/02; E05D 7/04; E05D 7/081; E05D 2007/0484; E05D 3/04; F25D 2323/024
See application file for complete search history.

(56) References Cited

U.S. PATENT DOCUMENTS

| 1,768,793 A | * | 7/1930 | Sheard ..................... E05D 5/121 |
| 3,083,403 A | * | 4/1963 | Van Noord ............... E05D 3/18 |

16/340
16/361

(Continued)

FOREIGN PATENT DOCUMENTS

| CN | 201221257 Y  | 4/2009 |
| JP | H04-131682 A | 5/1992 |
| JP | 2003-130538 A | 5/2003 |

*Primary Examiner* — Jeffrey O'Brien
(74) *Attorney, Agent, or Firm* — ScienBiziP, P.C.

(57) ABSTRACT

A first hinge 11 comprises: a first turning shaft portion 111 which extends vertically; a first supporting portion 112 which is extended longitudinally and laterally, and supports the bottom of the first turning shaft portion 111; and a first mounting portion 113 which extends downwardly from the rear end of the first supporting portion 112. A second hinge 12 comprises: a second turning shaft portion 121 which extends vertically; a second supporting portion 122 which is extended longitudinally and laterally, and supports the top of the second turning shaft portion 121; and a second mounting portion 123 which extends upwardly from the rear end of the second supporting portion 122. The first supporting portion 112 is disposed above the second supporting portion 122. The first mounting portion 113 is disposed below the second supporting portion 122. The second mounting portion 123 is disposed above the first supporting portion 112.

7 Claims, 12 Drawing Sheets

(56) References Cited

U.S. PATENT DOCUMENTS

| | | | | |
|---|---|---|---|---|
| 3,430,386 A * | 3/1969 | Schmitt | ............... | E05D 3/04 49/382 |
| 4,151,681 A * | 5/1979 | Roberts | ............... | E05D 3/04 312/321.5 |
| 4,774,740 A * | 10/1988 | Gidseg | ............... | E05D 11/1078 16/344 |
| 4,864,691 A * | 9/1989 | Gidseg | ............... | E05D 3/04 16/312 |
| 5,787,724 A * | 8/1998 | Pohl | ............... | B67D 1/0858 16/386 |
| 5,788,351 A * | 8/1998 | Prunty | ............... | A47L 15/4261 16/235 |
| 5,975,663 A * | 11/1999 | Becker | ............... | A47B 96/00 16/374 |
| 6,030,064 A * | 2/2000 | Kim | ............... | E05D 7/0423 312/405 |
| 7,065,832 B2 * | 6/2006 | Pohl | ............... | F25D 23/028 16/221 |
| 7,621,022 B2 * | 11/2009 | Gandevia | ............... | E05D 9/005 16/225 |
| 8,011,064 B2 * | 9/2011 | Leimkuehler | ............... | E05D 11/0054 16/251 |
| 8,166,611 B2 * | 5/2012 | Moon | ............... | E05D 7/081 16/240 |
| 9,834,967 B2 * | 12/2017 | Johnson | ............... | E05D 7/081 |
| 9,976,328 B2 * | 5/2018 | Kim | ............... | E05D 7/081 |
| 10,451,332 B2 * | 10/2019 | Yi | ............... | E05D 3/02 |
| 10,859,307 B2 * | 12/2020 | Yi | ............... | E05D 3/02 |
| 2005/0194874 A1 * | 9/2005 | Jang | ............... | E05D 5/065 312/405 |
| 2013/0154464 A1 * | 6/2013 | Fiori | ............... | E05D 7/0423 312/405 |
| 2013/0249373 A1 * | 9/2013 | Lively | ............... | F25D 23/028 312/405 |
| 2016/0362934 A1 * | 12/2016 | Swafford | ............... | E06B 3/921 |
| 2020/0080356 A1 * | 3/2020 | Yang | ............... | E05D 7/123 |
| 2020/0292226 A1 * | 9/2020 | Hunter | ............... | E05D 7/02 |

\* cited by examiner

HINGE DEVICE AND STORAGE PROVIDED WITH SAME

TECHNICAL FIELD

The present invention relates to a hinge device and a storage provided with the same.

BACKGROUND ART

Conventionally, there have been known refrigerators having doors which are aligned at upper and lower positions and are opened and closed by being turned (for example, Patent Documents 1 and 2 listed below). The upper and lower doors are each openable and closable by means of a hinge.

Patent Document 1 discloses a configuration where upper and lower turnable doors are supported by a common door supporting device. The door supporting device includes a hinge. The hinge has a support pin projecting both upward and downward to support both of the upper and lower turnable doors.

Patent Document 2 discloses a configuration where a lower hinge and an upper hinge are disposed between upper and lower doors. The lower hinge has an L-shape constituted of a horizontal surface having a hinge pin disposed near a front end portion thereof to project upward and a vertical surface extending upward from a rear end portion of the horizontal surface. The hinge pin of the lower hinge functions as a turning shaft of the upper door. The upper hinge has an L-shape formed by a horizontal surface having a hinge pin disposed near a front end portion thereof to project downward and a vertical surface extending downward from a rear end portion of the horizontal surface. The hinge pin of the upper hinge functions as a turning shaft of the lower door. The upper hinge is entirely disposed below the lower hinge.

LIST OF CITATIONS

Patent Literature

Patent Document 1: Japanese Patent Application Publication No. H04-131682
Patent Document 2: Japanese Patent Application Publication No. 2003-130538

SUMMARY OF THE INVENTION

Technical Problem

With the configuration disclosed in Patent Document 1, it is impossible to adjust positions of the upper door and the lower door independently of each other with respect to the main portion (such as a refrigerator cabinet). With the configuration disclosed in Patent Document 2, it is impossible to adjust the position of a door (for example, adjusting the position in a left-right direction) with the door closed, because the position to which a hinge fastener (such as a bolt) is to be fitted is concealed behind the closed door. Thus, positional adjustment of a door needs to be performed with the door opened. Even when the positional adjustment is performed with the door opened, it is necessary to close the door to check the door position after the positional adjustment, and this is inefficient.

In view of the above problem, an object of the present invention is to provide a hinge device that enables positional adjustment of two doors to be performed with the two doors closed. Furthermore, another object of the present invention is to provide a storage provided with such a hinge device.

Solution to Problem

In order to achieve the above objects, according to an aspect of the present invention, a hinge device couples a door to a mounting target to be turnable about a turning shaft extending in an up-down direction, and the hinge device includes a first hinge which couples a first door to a mounting surface of the mounting target, and a second hinge which couples a second door disposed under the first door to the mounting surface. Here, the first hinge includes a first turning shaft portion which extends in the up-down direction, a first supporting portion which extends in a front-rear direction and a left-right direction and supports a bottom of the first turning shaft portion, and a first mounting portion which extends downward from a rear end portion of the first supporting portion and is secured to the mounting surface, the second hinge includes a second turning shaft portion which extends in the up-down direction, a second supporting portion which extends in the front-rear direction and the left-right direction and supports a top of the second turning shaft portion, and a second mounting portion which extends upward from a rear end portion of the second supporting portion and is secured to the mounting surface, and the first supporting portion is disposed over the second supporting portion, the first mounting portion is disposed below the second supporting portion, and the second mounting portion is disposed above the first supporting portion.

In the hinge device configured as described above, it is preferable that, in plan view as seen from front, the first mounting portion which continuously connects with the first supporting portion exist below the first turning shaft portion.

In the hinge device configured as described above, it is preferable that at least one of the first hinge and the second hinge be provided with an opening portion, and that the other of the first hinge and the second hinge be inserted in the opening portion to thereby form a crossing portion.

In the hinge device configured as described above, it is preferable that the opening portion be provided astride the first supporting portion and the first mounting portion or astride the second supporting portion and the second mounting portion, and that the opening portion have a width in the front-rear direction that is greater than a sum of widths of the first mounting portion and the second mounting portion in the front-rear direction.

In the hinge device configured as described above, it is preferable that the first hinge have, as the opening portion, a first opening portion formed in the first mounting portion, that the second hinge have, as the opening portion, two second opening portions provided astride the second supporting portion and the second mounting portion, that the first mounting portion have a first portion and a second portion which sandwich the first opening portion therebetween in the left-right direction, that the two second opening portions be disposed with a space therebetween in the left-right direction, that the first portion be inserted in one of the two second opening portions, and that the second portion be inserted in the other of the two second opening portions.

In the hinge device configured as described above, it is preferable that the first mounting portion and the second mounting portion do not overlap with each other in plan view as seen in the up-down direction, or the first mounting portion and the second mounting portion overlap with each other in plan view as seen in the up-down direction and an overlapping portion of at least one of the first mounting portion and the second mounting portion, the overlapping portion overlapping with another of the first mounting portion and the second mounting portion, entirely continuously connect with the supporting portion.

According to another aspect of the present invention, a storage includes any one of the hinge devices configured as described above.

Advantageous Effects of Invention

According to the present invention, in a case where two hinges are aligned in the up-down direction, it is possible to reduce a space necessary for a hinge device in the up-down direction. A hinge mounted on an upper door has a mounting portion extending downward, and a hinge mounted on a lower door has a mounting portion extending upward. With this configuration, it is possible to perform positional adjustment of each door in its closed state. Furthermore, according to the present invention, it is possible to provide a storage provided with such a hinge device.

DESCRIPTION OF EMBODIMENTS

Hereinafter, a detailed description will be given of a hinge device and a storage embodying the present invention. Herein, an up-down direction is a direction in which a turning axis of a hinge device extends. Of two mutually perpendicular directions which are both orthogonal to the up-down direction, one is a front-rear direction, and the other is a left-right direction. Furthermore, herein, a mounting surface on which the hinge device is mounted is orthogonal to the front-rear direction. However, the up-down, front-rear, and left-right directions herein are defined for convenience of description, and are by no means meant to limit the position in which the hinge device according to the present invention is placed when in use.

<1. Storage>

Figure 1:
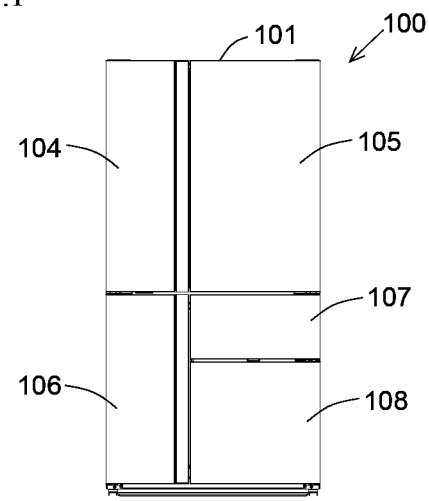
FIG. 1 is a schematic front view of a refrigerator as an example of a storage to which a hinge device embodying the present invention is applied.
Figure 2:
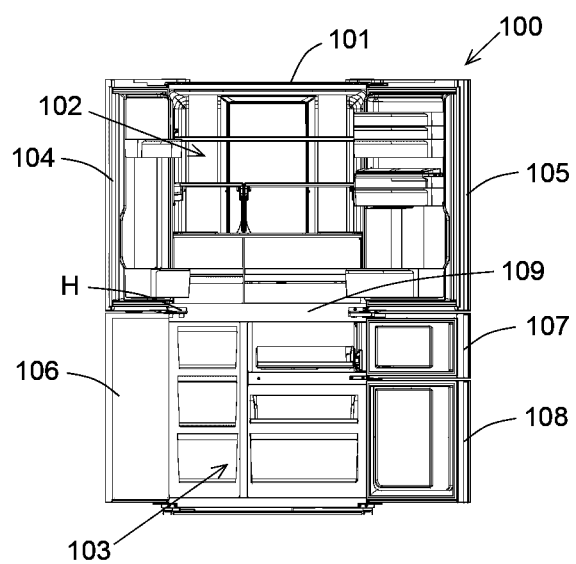
FIG. 2 is a schematic front view of the refrigerator illustrated in FIG. 1, with doors opened.

FIG. 1 is a schematic front view of a refrigerator 100 as an example of a storage to which a hinge device embodying the present invention is applied. FIG. 2 is a schematic front view of the refrigerator 100 illustrated in FIG. 1, with doors opened. As illustrated in FIG. 1 and FIG. 2, the refrigerator 100 has a cabinet 101 which constitutes a thermal insulation box body. The cabinet 101 has a cold storage compartment 102 in an upper portion thereof, and a freezer compartment 103 in a lower portion thereof.

The cold storage compartment 102 is provided with cold-storage-compartment doors 104 and 105 as double doors. The freezer compartment 103 is provided with freezer-compartment doors 106, 107, and 108 as double doors. Each of the doors 104 to 108 is openable and closable by being turned by means of hinges disposed at upper and lower portions thereof. In FIG. 1 and FIG. 2, the turning axis of each hinge extends in the up-down direction.

A hinge device H embodying the present invention couples the cold-storage-compartment door 104 and the freezer-compartment door 106 to the cabinet 101 to be turnable about a turning axis extending in the up-down direction. The cabinet 101 is an example of a mounting target of the present invention. Here, the hinge device of the present invention is preferably applied for the purpose of coupling the cold-storage-compartment door 105 and the freezer-compartment door 107, which are aligned in the up-down direction, to the cabinet 101. The hinge device of the present invention may be applied for the purpose of coupling the two freezer-compartment doors 107 and 108, which are aligned in the up-down direction, to the cabinet 101.

<2. First Embodiment of Hinge Device>

Figure 3:
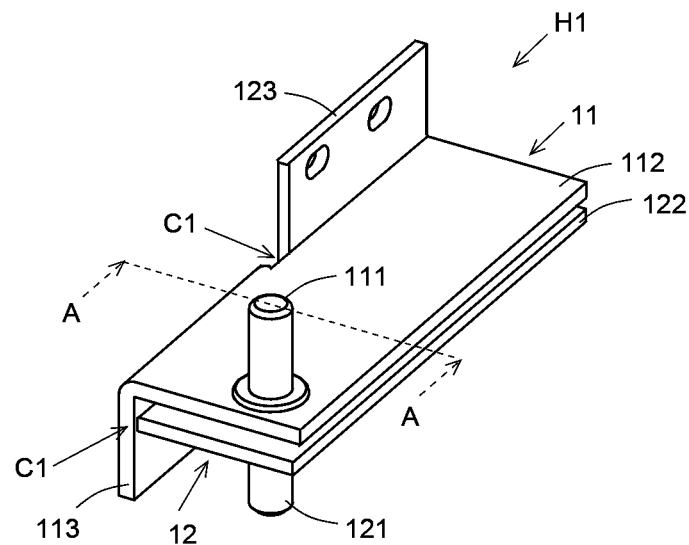
FIG. 3 is a schematic perspective view of a hinge device according to a first embodiment of the present invention.
Figure 4:
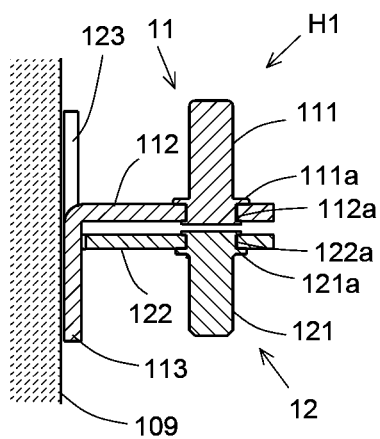
FIG. 4 is a schematic sectional view taken along line A-A of FIG. 3.

FIG. 3 is a schematic perspective view of a hinge device H1 according to a first embodiment of the present invention. FIG. 4 is a schematic sectional view taken along line A-A of FIG. 3. For easier understanding, a mounting surface 109, on which the hinge device H1 is mounted, is also illustrated in FIG. 4. As illustrated in FIG. 3 and FIG. 4, the hinge device H1 includes a first hinge 11 and a second hinge 12. The first hinge 11 couples the cold-storage-compartment door 104 to the mounting surface 109 of the cabinet 101. The second hinge 12 couples the freezer-compartment door 106, which is disposed under the cold-storage-compartment door 104, to the mounting surface 109. Here, the mounting surface 109 is located substantially at a center portion of the cabinet 101 in the up-down direction (see FIG. 2). The cold-storage-compartment door 104 is an example of a first door of the present invention. The freezer-compartment door 106 is an example of a second door of the present invention.

Figure 5:
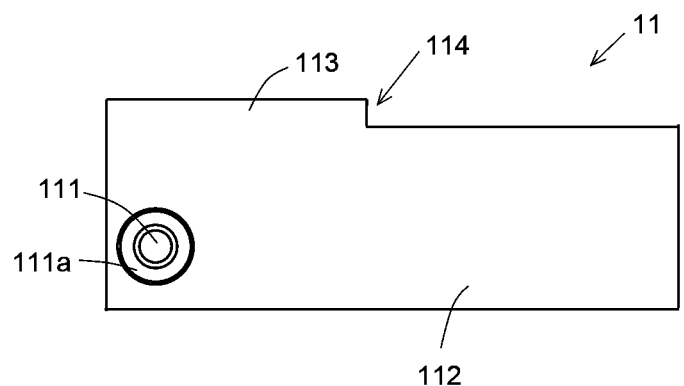
FIG. 5 is a schematic top view of a first hinge of the hinge device according to the first embodiment of the present invention.
Figure 6:
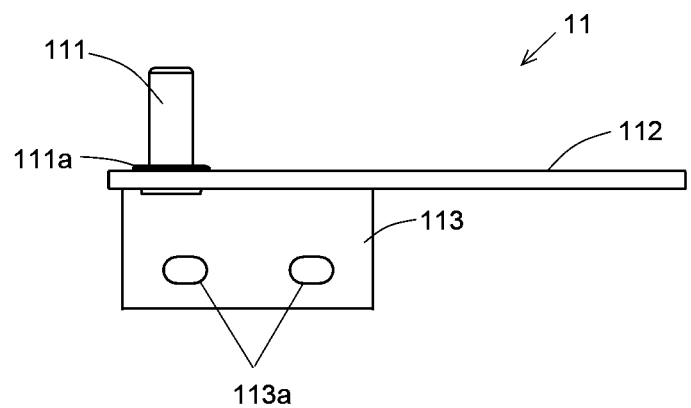
FIG. 6 is a schematic front view of the first hinge of the hinge device according to the first embodiment of the present invention.

FIG. 5 is a schematic top view of the first hinge 11 of the hinge device H1 according to the first embodiment of the present invention. FIG. 6 is a schematic front view of the first hinge 11 of the hinge device H1 according to the first embodiment of the present invention. As illustrated in FIG. 5 and FIG. 6, the first hinge 11 has a first turning shaft portion 111, a first supporting portion 112, and a first mounting portion 113.

The first turning shaft portion 111 extends in the up-down direction. The first turning shaft portion 111 is a metal pin having a substantially cylindrical external shape. The first turning shaft portion 111 is fitted in a hole (not shown) provided in a lower end portion of the cold-storage-compartment door 104. In the present embodiment, the first turning shaft portion 111 has a flange portion 111a disposed near its bottom. The flange portion 111a has a positioning function to restrict an upward projection amount of the first turning shaft portion 111 to a predetermined amount.

The first supporting portion 112 extends in the front-rear and left-right directions. The first supporting portion 112 is constituted by a sheet metal member having a flat surface portion extending in the front-rear and left-right directions. In the present embodiment, the first supporting portion 112 has a substantially rectangular shape that is longer in the left-right direction than in the front-rear direction. Here, the front-rear direction corresponds to the up-down direction in FIG. 5, and corresponds to a direction orthogonal to the sheet surface on which FIG. 6 is drawn. The eft-right direction corresponds to the left-right directions in FIG. 5 and FIG. 6.

The first supporting portion 112 supports a bottom of the first turning shaft portion 111. In the present embodiment, the first supporting portion 112 has a first through hole 112a (see FIG. 4) formed in a left end portion thereof, the left end portion being one end portion of the first supporting portion 112 in the left-right direction. The first through hole 112a is disposed closer to the front in the front-rear direction than a center portion of the first supporting portion 112 is. The first turning shaft portion 111 has its lower end portion fitted in the through hole 112a and secured to the first supporting portion 112 by swaging.

The first mounting portion 113 extends downward from a rear end portion of the first supporting portion 112. The first mounting portion 113 is secured to the mounting surface 109. The mounting surface 109 is a flat surface that is parallel to the up-down direction. The first mounting portion 113 has a flat surface that is parallel to the mounting surface 109. The first mounting portion 113, which is constituted of the same member as the first supporting portion 112, is obtained by bending a portion projecting from the first supporting portion 112.

In the present embodiment, the first mounting portion 113 is provided in a range, in the left-right direction, from a left end of the first supporting portion 112 to a position slightly closer to the left end than the center portion of the first supporting portion 112 is. The first mounting portion 113 is a plate-shaped portion that is substantially rectangular in plan view as seen from the front. In plan view as seen from the front, below the first turning shaft portion 111, the first mounting portion 113 exists which continuously connects with the first supporting portion 112 (see FIG. 6, for example).

The first mounting portion 113 has two first long holes 113a formed therein, which are disposed with a space therebetween in the left-right direction. The first long holes 113a each extend in the left-right direction. The first long holes 113a penetrate the first mounting portion 113 in the front-rear direction. In each of the first long holes 113a, a fastener is inserted to secure the first hinge 11 to the mounting surface 109. The fastener is a bolt or a screw, for example. It is for the purpose of making the position of the cold-storage-compartment door 104 adjustable in the left-right direction that the long holes are provided in the first mounting portion 113.

Figure 7:
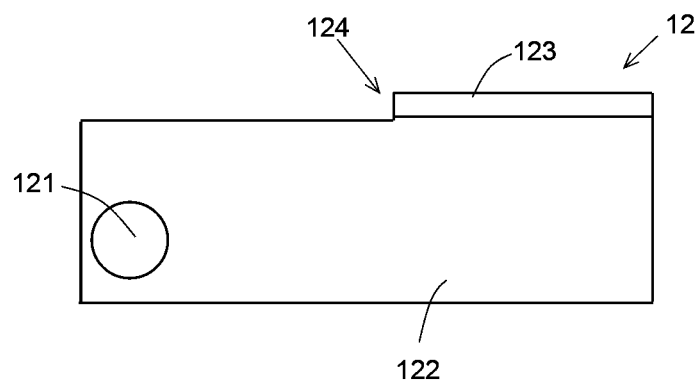
FIG. 7 is a schematic top view of a second hinge of the hinge device according to the first embodiment of the present invention.
Figure 8:
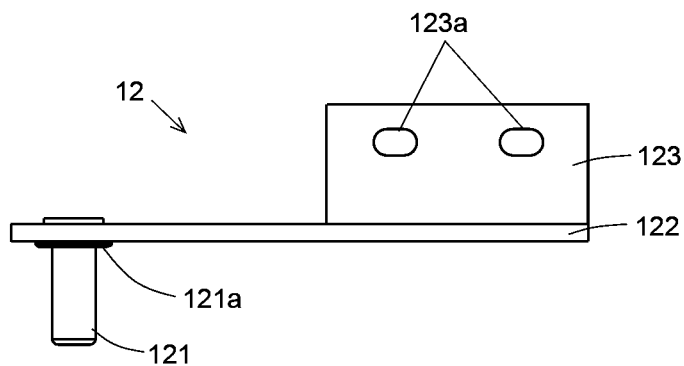
FIG. 8 is a schematic front view of the second hinge of the hinge device according to the first embodiment of the present invention.

FIG. 7 is a schematic top view of the second hinge 12 of the hinge device H1 according to the first embodiment of the present invention. FIG. 8 is a schematic front view of the second hinge 12 of the hinge device H1 according to the first embodiment of the present invention. As illustrated in FIG. 7 and FIG. 8, the second hinge 12 has a second turning shaft portion 121, a second supporting portion 122, and a second mounting portion 123.

The second turning shaft portion 121 extends in the up-down direction. The second turning shaft portion 121 is a metal pin having a substantially cylindrical external shape. The second turning shaft portion 121 is fitted in a hole (not shown) provided in an upper end portion of the freezer-compartment door 106. In the present embodiment, the second turning shaft portion 121 has a flange portion 121a disposed near its top. The flange portion 121a has a positioning function to restrict a downward projection amount of the second turning shaft portion 121 to a predetermined amount.

The second supporting portion 122 extends in the front-rear and left-right directions. The second supporting portion 122 is constituted by a sheet metal member having a flat surface portion extending in the front-rear and left-right directions. In the present embodiment, the second supporting portion 122 has a substantially rectangular shape that is longer in the left-right direction than in the front-rear direction. The second supporting portion 122 and the first supporting portion 112 are substantially the same in shape and size. Here, the first supporting portion 112 and the second supporting portion 122 may have different shapes or may have different sizes.

The second supporting portion 122 supports a top of the second turning shaft portion 121. In the present embodiment, the second supporting portion 122 has a second through hole 122a (see FIG. 4) formed in a left end portion thereof, the left end portion being one end portion of the second supporting portion 122 in the left-right direction. The second through hole 122a is disposed closer to the front in the front-rear direction than a center portion of the second supporting portion 122 is. The second turning shaft portion 121 has its upper end portion put in the through hole 122a and secured to the second supporting portion 122 by swaging.

The second mounting portion 123 extends upward from a rear end portion of the second supporting portion 122. The second mounting portion 123 is secured to the mounting surface 109. The second mounting portion 123 has a flat surface that is parallel to the mounting surface 109. The second mounting portion 123, which is constituted of the same member as the second supporting portion 122, is obtained by bending a portion projecting from the second supporting portion 122.

In the present embodiment, the second mounting portion 123 is provided in a range, in the left-right direction, from a right end of the second supporting portion 122 to a position that is slightly closer to the right end than the center portion of the second supporting portion 122 is. The second mounting portion 123 is a plate-shaped portion that is substantially rectangular in plan view as seen in the front-rear direction. The second mounting portion 123 has a length (thickness) in the front-rear direction that is substantially equal to a length of the first mounting portion 113 in the front-rear direction.

The second mounting portion 123 has two second long holes 123a formed therein, which are disposed with a space therebetween in the left-right direction. The second long holes 123a each extend in the left-right direction. The second long holes 123a penetrate the second mounting portion 123 in the front-rear direction. In each of the second long holes 123a, a fastener (such as a bolt, for example) is inserted to secure the second hinge 12 to the mounting surface 109. It is for the purpose of making the position of the freezer-compartment door 106 adjustable in the left-right direction that the long holes are provided in the second mounting portion 123.

In the first hinge 11, with respect to the front-rear direction, the portion where the first mounting portion 113 is provided is wider than the portion where the first mounting portion 113 is not provided. The first hinge 11 has a first step portion 114 in a rear side thereof (see FIG. 5). In the second hinge 12, with respect to the front-rear direction, the portion where the second mounting portion 123 is provided is wider than the portion where the second mounting portion 123 is not provided. The second hinge 12 has a second step portion 124 in a rear side thereof (see FIG. 7). As illustrated in FIG. 3, by means of these two step portions 114 and 124, the first hinge 11 and the second hinge 12 have crossing portions C1.

As illustrated in FIG. 3 and FIG. 4, in the hinge device H1, the first supporting portion 112 is disposed over the second supporting portion 122. In the present embodiment, the first supporting portion 112 and the second supporting portion 122 are disposed such that, in plan view as seen in the up-down direction, positions of four corners of the first supporting portion 112 are substantially identical to those of the second supporting portion 122. Furthermore, in plan view as seen in the up-down direction, the first turning shaft portion 111 and the second turning shaft portion 121 are provided at overlapping positions. Here, turning centers of the first turning shaft portion 111 and the second turning shaft portion 121 may be in or out of alignment with each other. The first turning shaft portion 111 and the second turning shaft portion 121 may be positioned such that they do not overlap with each other at all in plan view as seen in the up-down direction, depending on cases.

Furthermore, in the present embodiment, in the up-down direction, a clearance is formed between the first supporting portion 112 and the second supporting portion 122. With this configuration, in adjusting the position of one of the first hinge 11 and the second hinge 12, it is possible to carry out the positional adjustment smoothly without interfering with the other hinge. Moreover, in the up-down direction, too, their positions are slightly adjustable. Here, in a case where it is not necessary to adjust the positions of the first hinge 11 and the second hinge 12 in the up-down direction, the first supporting portion 112 and the second supporting portion 122 may be disposed in contact with each other. With such a configuration, it is possible to have the first hinge 11, which receives a load from the cold-storage-compartment door 104, supported by the second hinge 12 as well.

In the state where the first supporting portion 112 is disposed over the second supporting portion 122, the first mounting portion 113 and the second mounting portion 123 are disposed at opposite positions in the left-right direction, and thus are not in contact with each other. The first mounting portion 113 projects downward past a rear end of the portion of the second hinge 12 that is narrow in the front-rear direction. On the other hand, the second mounting portion 123 projects upward past a rear end of the portion of the first hinge 11 that is narrow in the front-rear direction. That is, the first mounting portion 113 is disposed below the second supporting portion 122, and the second mounting portion 123 is disposed above the first supporting portion 112. Here, the first mounting portion 113 and the second mounting portion 123 are mounted on the mounting surface 109, as illustrated in FIG. 4, with rear surfaces of the first and second mounting portions 113 and 123 substantially flush with each other.

Figure 9:
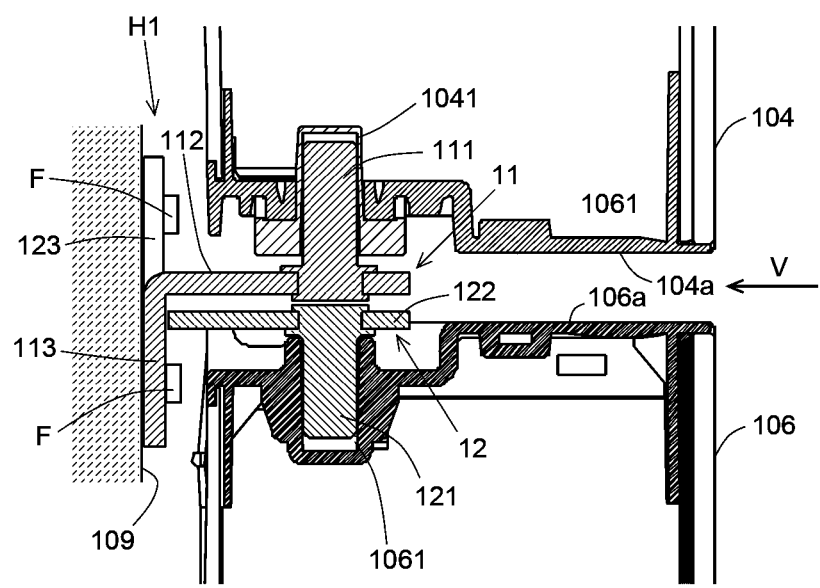
FIG. 9 is an enlarged schematic sectional view of and around the hinge device according to the first embodiment of the present invention as applied to a refrigerator.

FIG. 9 is an enlarged schematic sectional view of and around the hinge device H1 according to the first embodiment of the present invention applied to the refrigerator 100. FIG. 9 illustrates a state where the doors 104 and 106 of the refrigerator 100 are closed. The first hinge 11 and the second hinge 12 are mounted on the mounting surface 109 with the first supporting portion 112 disposed over the second supporting portion 122. The first hinge 11 and the second hinge 12 are each secured to the mounting surface 109 with a fastener F (for example, a bolt).

The cold-storage-compartment door 104 has an insertion hole 1041 formed in a lower surface 104a thereof. The insertion hole 1041 extends in the up-down direction, and has the first turning shaft portion 111 inserted therein. The freezer-compartment door 106 has an insertion hole 1061 formed in an upper surface 106a thereof. The insertion hole 1061 extends in the up-down direction, and has the second turning shaft portion 121 inserted therein. When seen from the front (when seen in the arrow V direction in FIG. 9), the place at which the fastener F is fitted to the first mounting portion 113 is concealed behind the freezer-compartment door 106 that is closed, but not behind the cold-storage-compartment door 104 that is closed. Furthermore, when seen from the front, the place at which the fastener F is fitted to the second mounting portion 123 is concealed behind cold-storage-compartment door 104 that is closed, but not behind the freezer-compartment door 106 that is closed.

In assembling the thus configured refrigerator 100, for example, after the freezer-compartment door 106 is mounted on the cabinet 101, the cold-storage-compartment door 104 is mounted on the cabinet 101. First, the second turning shaft portion 121 of the second hinge 12 is inserted in the insertion hole 1061, and thereby the freezer-compartment door 106 is held by the second hinge 12. By securing the second hinge 12 to the mounting surface 109 in this state, the freezer-compartment door 106 is turnably mounted on the cabinet 101. Even when the freezer-compartment door 106 is in its closed position, it is possible to adjust the position of the door 106 in the left-right direction while keeping the second mounting portion 123 visible as seen from the front of the refrigerator 100. This makes it possible to carry out the positional adjustment of the freezer-compartment door 106 efficiently without relying on experience or intuition.

With the second hinge 12 secured to the mounting surface 109 with the fastener F, it is possible to combine the first hinge 11 with the second hinge 12 by means of the step portions 114 and 124. The first turning shaft portion 11 of the first hinge 11 combined with the second hinge 12 is inserted in the insertion hole 1041, and thereby the cold-storage-compartment door 104 is held by the first hinge 11. By securing the first hinge 11 to the mounting surface 109 in this state, the cold-storage-compartment door 104 is turnably mounted on the cabinet 101. In mounting the cold-storage-compartment door 104, even with the cold-storage-compartment door 104 in its closed position, when the freezer-compartment door 106 is kept open, it is possible to adjust the position of the door 104 in the left-right direction while keeping the first mounting portion 113 visible. This makes it possible to carry out the positional adjustment of the cold-storage-compartment door 104 efficiently without relying on experience or intuition.

In the hinge device H1 of the present embodiment, the two hinges 11 and 12 has the crossing portion C1. With this configuration, despite that the two hinges 11 and 12 are aligned in the up-down direction, the space in the up-down direction necessary for the hinge device H1 may be small. Thus, by adopting the hinge device H1 of the present embodiment, it is possible to downsize the refrigerator 100 in the up-down direction. Furthermore, since the two turning shaft portions 111 and 121 are disposed at positions overlapping with each other in the up-down direction, it is possible to avoid reduction of the width in the left-right direction of either one of the cold storage compartment 102 and the freezer compartment 103.

The first hinge 11 supports the door 104 from below. Thus, the first hinge 11 tends to receive a large load. With this in mind, in the present embodiment, in plan view as seen from the front, below the first turning shaft portion 111, the first mounting portion 113 exists which continuously connects with the first supporting portion 112, and thus strength of the vicinity of the first turning shaft portion 111 is enhanced. With this configuration, it is possible to securely support the door 104.

In the present embodiment, in plan view as seen in the up-down direction, the first mounting portion 113 and the second mounting portion 123 are disposed adjacent to each other, that is, not overlapping with each other. With this configuration, it is possible to pull out the first hinge 11 upward even with the second hinge 12 secured to the mounting surface 109. Furthermore, it is possible to pull out the second hinge 12 downward even with the first hinge 11 secured to the mounting surface 109. There may be a case where, for example, after securing the two hinges 11 and 12 to the mounting surface 109 with the fasteners F, it turns out that the position of either one of them needs to be adjusted. In such a case, this configuration is convenient, because it allows a position-adjusting operation to be carried out by removing only the fastener of the hinge the position of which needs to be adjusted.

<2. Second Embodiment of Hinge Device>

Figure 10:
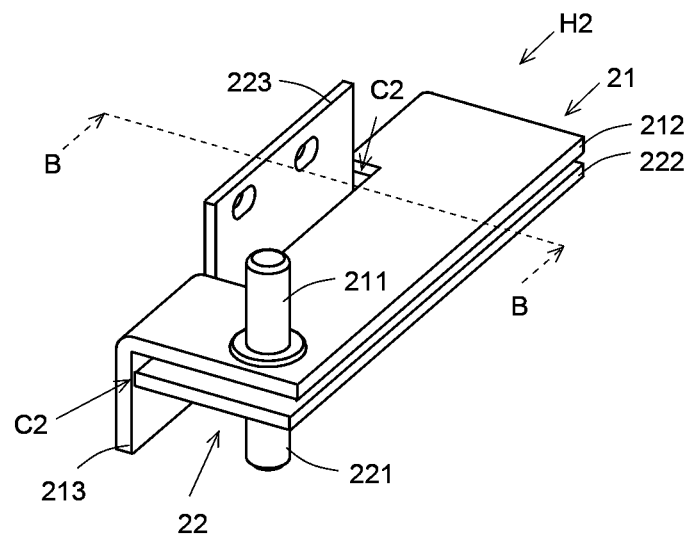
FIG. 10 is a schematic perspective view of a hinge device according to a second embodiment of the present invention.
Figure 11:
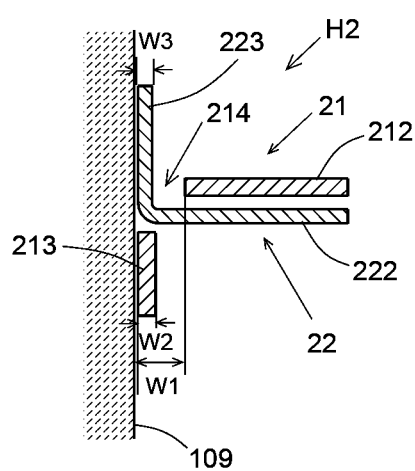
FIG. 11 is a schematic sectional view taken along line B-B of FIG. 10.

Next, a hinge device of a second embodiment will be described. In the descriptions of the hinge device of the second embodiment, descriptions overlapping with the first embodiment will be omitted unless necessary. FIG. 10 is a schematic perspective view of a hinge device 112 according to the second embodiment of the present invention. FIG. 11 is a schematic sectional view taken along line B-B of FIG. 10. For easier understanding, the mounting surface 109, on which the hinge device H2 is mounted, is also illustrated in FIG. 11. As illustrated in FIG. 10 and FIG. 11, the hinge device 112 includes a first hinge 21 and a second hinge 22. The first hinge 21 couples the cold-storage-compartment door 104 to the mounting surface 109 of the cabinet 101. The second hinge 22 couples the freezer-compartment door 106 to the mounting surface 109.

Figure 12:
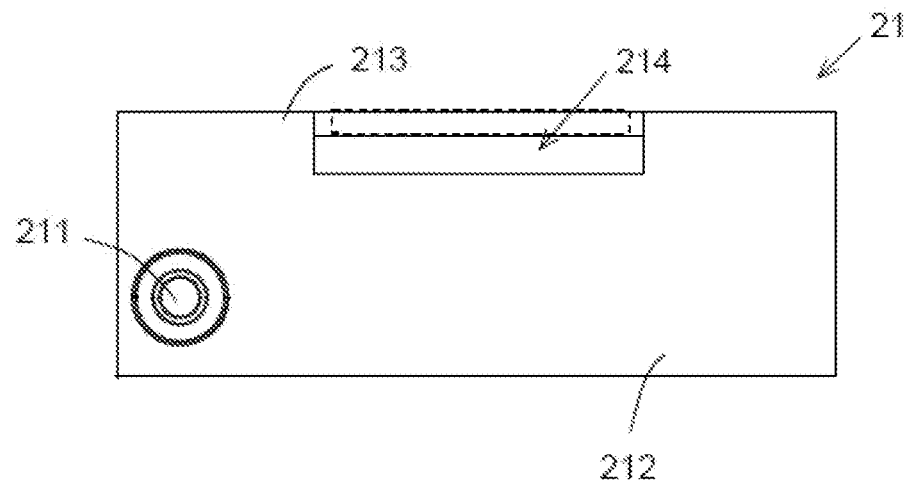
FIG. 12 is a schematic top view of a first hinge of the hinge device according to the second embodiment of the present invention.
Figure 13:
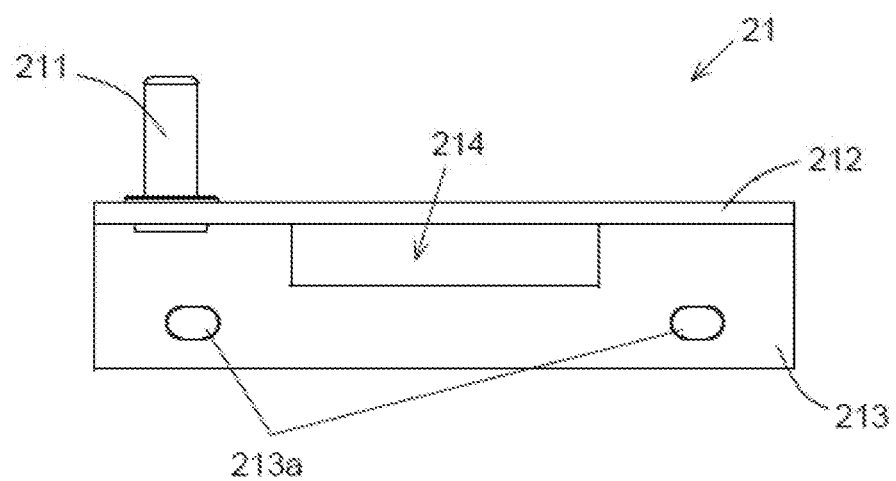
FIG. 13 is a schematic front view of the first hinge of the hinge device according to the second embodiment of the present invention.

FIG. 12 is a schematic top view of the first hinge 21 of the hinge device H2 according to the second embodiment of the present invention. FIG. 13 is a schematic front view of the first hinge 21 of the hinge device H2 according to the second embodiment of the present invention. As illustrated in FIG. 12 and FIG. 13, the first hinge 21 has a first turning shaft portion 211, a first supporting portion 212, and a first mounting portion 213.

The first turning shaft portion 211, which extends in the up-down direction, is similar in configuration to the first turning shaft portion 111 of the first embodiment, and thus a detailed description thereof will be omitted. The first supporting portion 212, which extends in the front-rear and left-right directions, is substantially similar in configuration to the first supporting portion 112 of the first embodiment, and thus descriptions of such portions as overlap between the two embodiments will be omitted.

The first mounting portion 213 extends downward from a rear end portion of the first supporting portion 212. The first mounting portion 213 has a flat surface that is parallel to the mounting surface 109, and is secured to the mounting surface 109. The first mounting portion 213, which is constituted of the same member as the first supporting portion 212, is obtained by bending a portion projecting from the first supporting portion 212. As in the first embodiment, the first mounting portion 213 has two first long holes 213a formed therein, which are disposed with a space therebetween in the left-right direction.

In the present embodiment, the first mounting portion 213 has a length in the left-right direction that is substantially equal to a length of the first supporting portion 212 in the left-right direction. The first mounting portion 213 is a plate-shaped portion that is substantially rectangular in plan view as seen from the front. In plan view as seen from the front, below the first turning shaft portion 211, the first mounting portion 213 exits which continuously connects with the first supporting portion 212. With this configuration, an area in the vicinity of the first turning shaft portion 211 which receives a large load is enhanced in strength, and thus it is possible to securely support the door 104.

The first hinge 21 has an opening portion 214. The opening portion 214 is an example of an opening portion of the present invention. The opening portion 214 is provided astride the first supporting portion 212 and the first mounting portion 213. The opening portion 214 is provided substantially at a center portion in the left-right direction. The opening portion 214 is a through hole. The opening portion 214 is obtained, for example, by pressing a sheet metal member before it is bent to form the first mounting portion 213. In the present embodiment, the opening portion 214 is obtained by forming a substantially rectangular hole in the sheet metal member.

Figure 14:
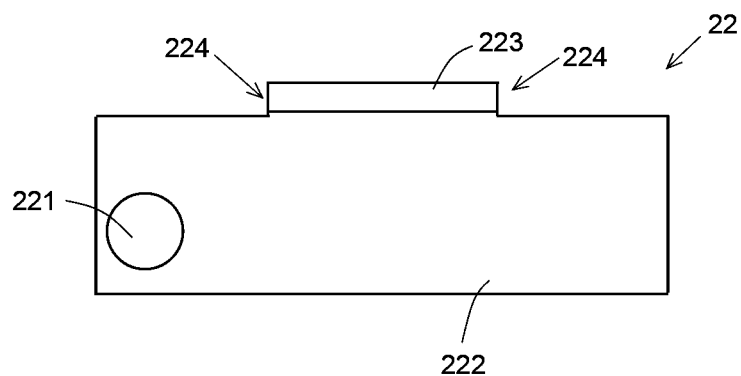
FIG. 14 is a schematic top view of a second hinge of the hinge device according to the second embodiment of the present invention.
Figure 15:
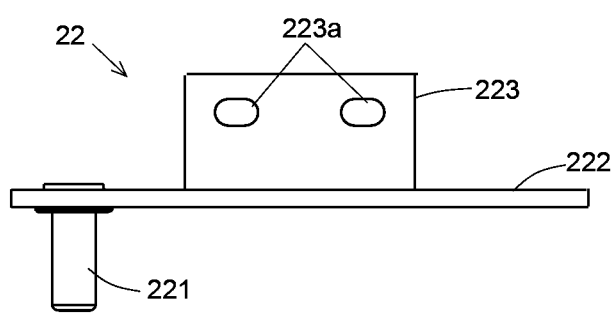
FIG. 15 is a schematic front view of the second hinge of the hinge device according to the second embodiment of the present invention.

FIG. 14 is a schematic top view of the second hinge 22 of the hinge device H2 according to the second embodiment of the present invention. FIG. 15 is a schematic front view of the second hinge 22 of the hinge device 12 according to the second embodiment of the present invention. As illustrated in FIG. 14 and FIG. 15, the second hinge 22 has a second turning shaft portion 221, a second supporting portion 222, and a second mounting portion 223.

The second hinge 22 of the second embodiment is substantially similar in configuration to the second hinge 12 of the first embodiment, and thus descriptions of such portions as overlap between the two embodiments will be omitted. Like the second hinge 12 of the first embodiment, the second hinge 22 has a second mounting portion 223 having two long holes 223a. However, unlike in the first embodiment, the second mounting portion 223 is disposed substantially at a center portion in the left-right direction.

In the second hinge 22, with respect to the front-rear direction, the portion where the second mounting portion 223 is provided is wider than the portion where the second mounting portion 223 is not provided. The second hinge 22 has two step portions 224 in a rear side thereof (see FIG. 14). By using the opening portion 214 provided in the first hinge 21 and the two step portions 224 provided in the second hinge 22, as illustrated in FIG. 10, the first hinge 21 and the second hinge 22 have crossing portions C2.

As illustrated in FIG. 10 and FIG. 11, in the hinge device H2, as in the hinge device H1 of the first embodiment, the first supporting portion 212 is disposed over the second supporting portion 222. In the state where the first supporting portion 212 is disposed over the second supporting portion 222, the second mounting portion 223 is inserted in the opening portion 214. This allows the second mounting portion 223 to project upward without contacting the first hinge 21. The opening portion 214 has a width in the left-right direction that is greater than a width of the second mounting portion 223 in the left-right direction. Furthermore, by means of the step portions 224, the first mounting portion 213 is allowed to project downward without contacting the second hinge 22. That is, the first mounting portion 213 is disposed below the second supporting portion 222, and the second mounting portion 223 is disposed above the first supporting portion 212. The first mounting portion 213 and the second mounting portion 223 are mounted on the mounting surface 109, as illustrated in FIG. 11, with rear surfaces of the first and second mounting portions 213 and 223 substantially flush with each other.

In assembling the refrigerator 100, for example, after the cold-storage-compartment door 104 is mounted on the cabinet 101, the freezer-compartment door 106 is mounted on the cabinet 101. Note that this procedure is reverse to that of the first embodiment. The first hinge 21 has the first mounting portion 213 extending downward. With this configuration, in mounting the cold-storage-compartment door 104, even with the cold-storage-compartment door 104 in its closed position, it is possible to adjust the position of the door 104 in the left-right direction while keeping the first mounting portion 213 visible. This makes it possible to carry out the positional adjustment of the cold-storage-compartment door 104 efficiently without relying on experience or intuition.

With the first hinge 21 secured to the mounting surface 109 with a fastener (such as a bolt, for example), it is possible to combine the second hinge 22 with the first hinge 21 by means of the opening portion 214 and the step portions 224. The second hinge 22, when combined with the first hinge 21, has the second mounting portion 223 extending upward. With this configuration, in mounting the freezer-compartment door 106, when the cold-storage-compartment door 104 is kept open, even with the freezer-compartment door 106 in its close position, it is possible to adjust the position of the door 106 in the left-right direction while keeping the second mounting portion 223 visible. This makes it possible to carry out the positional adjustment of the freezer-compartment door 106 efficiently without relying on experience or intuition.

In addition, the hinge device H2 of the second embodiment offers advantages similar to those offered by the hinge device H1 of the first embodiment. Furthermore, in the hinge device H2 of the second embodiment, the space provided between the two long holes 213a in the left-right direction can be made wider than in the hinge device H1 of the first embodiment.

In the hinge device H2 of the second embodiment, in plan view as seen in the up-down direction, the first mounting portion 213 has a portion (a portion enclosed by the broken line in FIG. 12) that overlaps with the second mounting portion 223. The overlapping portion of the first mounting portion 213 is spaced from the first supporting portion 212 by the existence of the opening portion 214, and thus does not continuously connect with the first supporting portion 212. It is impossible to pull out the first hinge 21 upward with the second hinge 22 secured to the mounting surface 109, because the first hinge 21 is interfered with by the second hinge 22.

Figure 16:
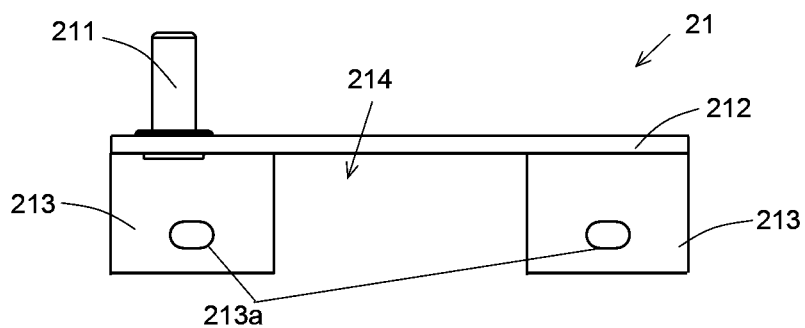
FIG. 16 is a schematic front view of a modified example of the first hinge of the hinge device according to the second embodiment of the present invention.

FIG. 16 is a schematic front view of a modified example of the first hinge 21 of the hinge device H2 according to the second embodiment of the present invention. In the first hinge 21 of the modified example, the first mounting portion 213 is divided in the left-right direction so as not to overlap with the second mounting portion 223 in plan view as seen in the up-down direction. With this configuration, it is possible to pull out the first hinge 21 upward with the second hinge 22 secured to the mounting surface 109.

In the hinge device H2 of the second embodiment, in plan view as seen in the up-down direction, the second mounting portion 223 overlaps with a portion of the first mounting portion 213. Here, the second mounting portion 223 entirely continuously connects with the second supporting portion 222. Even with the first hinge 21 secured to the mounting surface 109, since the second mounting portion 223 is allowed to pass through the opening portion 214, it is possible to pull out the second hinge 22 downward.

Here, it is preferable that a width W1 of the opening portion 214 in the front-rear direction be greater than a sum of a width (thickness) W2 of the first mounting portion 213 in the front-rear direction and a width W3 of the second mounting portion 223 in the front-rear direction (see FIG. 11). With such a configuration, it is easier to pull out the second hinge 22 by avoiding contact with the first hinge 21 or with the fastener securing the first hinge 21. In the present embodiment, the width W2 of the first mounting portion 213 in the front-rear direction and the width W3 of the second mounting portion 223 in the front-rear direction are equal to each other.

<4. Third Embodiment of Hinge Device>

Figure 17:
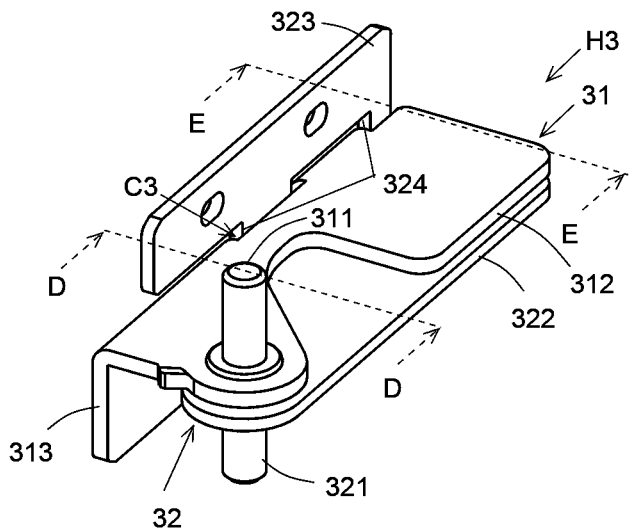
FIG. 17 is a schematic perspective view of a hinge device according to a third embodiment of the present invention.
Figure 18:
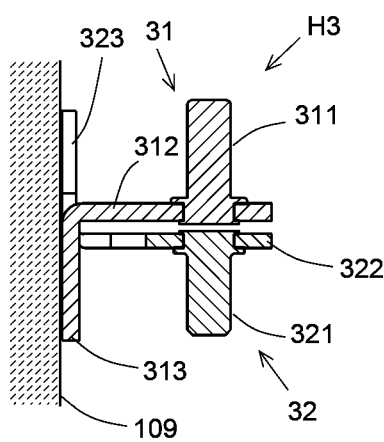
FIG. 18 is a schematic sectional view taken along line D-D of FIG. 17.
Figure 19:
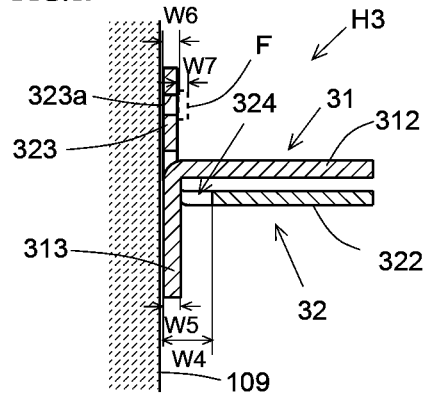
FIG. 19 is a schematic sectional view taken along line E-E of FIG. 17.

Next, a hinge device of a third embodiment will be described. In the descriptions of the hinge device of the third embodiment, descriptions overlapping with the first embodiment will be omitted unless necessary. FIG. 17 is a schematic perspective view of a hinge device H3 according to the third embodiment of the present invention. FIG. 18 is a schematic sectional view taken along line D-D of FIG. 17. FIG. 19 is a schematic sectional view taken along line E-E of FIG. 17. For easier understanding, the mounting surface 109, on which the hinge device H3 is mounted, is also illustrated in FIG. 18 and FIG. 19.

As illustrated in FIG. 17 to FIG. 19, the hinge device H3 includes a first hinge 31 and a second hinge 32. The first hinge 31 couples the cold-storage-compartment door 104 to the mounting surface 109 of the cabinet 101. The second hinge 32 couples the freezer-compartment door 106, which is disposed under the cold-storage-compartment door 104, to the mounting surface 109.

Figure 20:
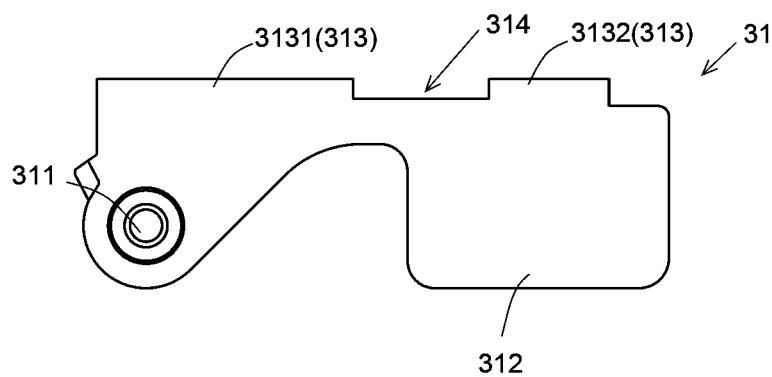
FIG. 20 is a schematic top view of a first hinge of the hinge device according to the third embodiment of the present invention.
Figure 21:
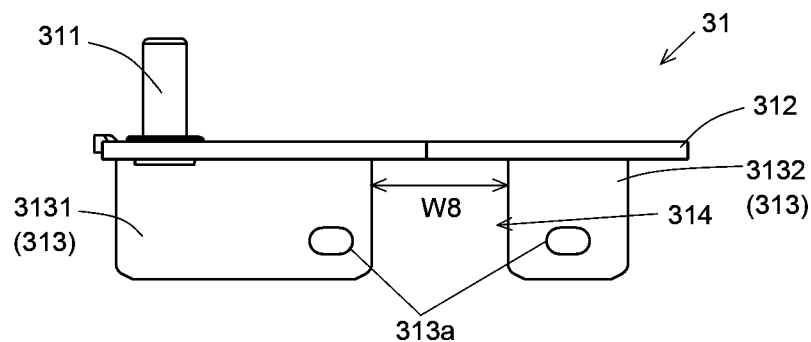
FIG. 21 is a schematic front view of the first hinge of the hinge device according to the third embodiment of the present invention.

FIG. 20 is a schematic top view of the first hinge 31 of the hinge device H3 according to the third embodiment of the present invention. FIG. 21 is a schematic front view of the first hinge 31 of the hinge device H3 according to the third embodiment of the present invention. As illustrated in FIG. 20 and FIG. 21, the first hinge 31 has a first turning shaft portion 311, a first supporting portion 312, and a first mounting portion 313.

The first turning shaft portion 311, which extends in the up-down direction, is similar in configuration to the first turning shaft portion 111 of the first embodiment, and thus a detailed description thereof will be omitted. The first supporting portion 312, which extends in the front-rear and left-right directions, is different in shape from the first supporting portion 112 of the first embodiment. However, the shape of the first supporting portion 312 may be changed as necessary, and thus may be similar to that of the first embodiment. The first supporting portion 312 supports the first turning shaft portion 311 with a structure similar to the structure with which the first supporting portion 112 supports the first turning shaft portion 111 in the first embodiment, and thus descriptions thereof will be omitted.

The first mounting portion 313 extends downward from a rear end portion of the first supporting portion 312. The first mounting portion 313 has a flat surface that is parallel to the mounting surface 109, and is secured to the mounting surface 109. The first mounting portion 313, which is constituted of the same member as the first supporting portion 312, is obtained by bending a portion projecting from the first supporting portion 312.

In the present embodiment, the first mounting portion 313 has a first portion 3131 and a second portion 3132, which are both plate-shaped and sandwich a first opening portion 314 therebetween in the left-right direction. The first portion 3131, the second portion 3132, and the first opening portion 314 are each substantially rectangular in plan view as seen from the front. The first portion 3131 is provided in a range, in the left-right direction, from a left end of the first supporting portion 312 to a position that is slightly closer to the left end than the center portion of the first supporting portion 312 is. The second portion 3132 is provided in a range from a position that is slightly closer to the center portion of the first supporting portion 312 than a right end of the first supporting portion 312 is to a position that is closer to the right end than the center portion of the first supporting portion 312 is. The first portion 3131 has a width in the left-right direction that is greater than a width of the second portion 3132 in the left-right direction. In plan view as seen from the front, the first mounting portion 313, which continuously connects with the first supporting portion 312, exists below the first turning shaft portion 311. With this configuration, an area in the vicinity of the first turning shaft portion 311 which receives a large load is enhanced in strength, and thus it is possible to securely support the door 104.

The first mounting portion 313 has two first long holes 313a of which one is disposed in the first portion 3131 and the other is disposed in the second portion 3132. The first long holes 313a have the same shape, and are disposed for the same purpose, as in the first embodiment.

Figure 22:
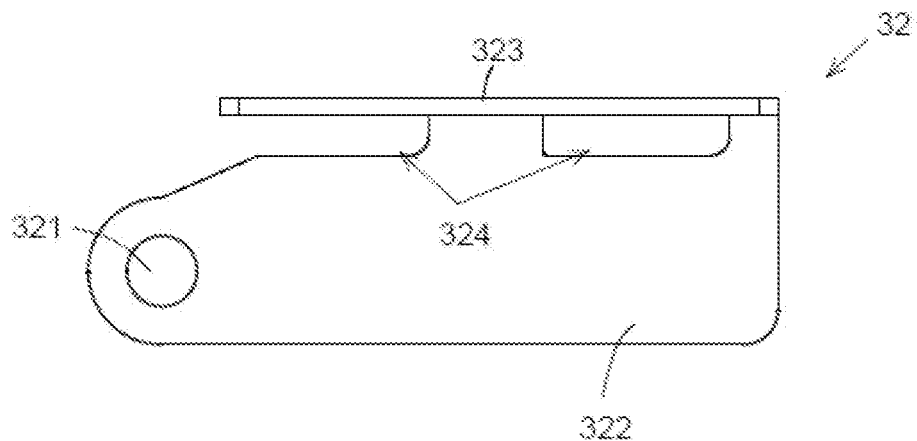
FIG. 22 is a schematic top view of a second hinge of the hinge device according to the third embodiment of the present invention.
Figure 23:
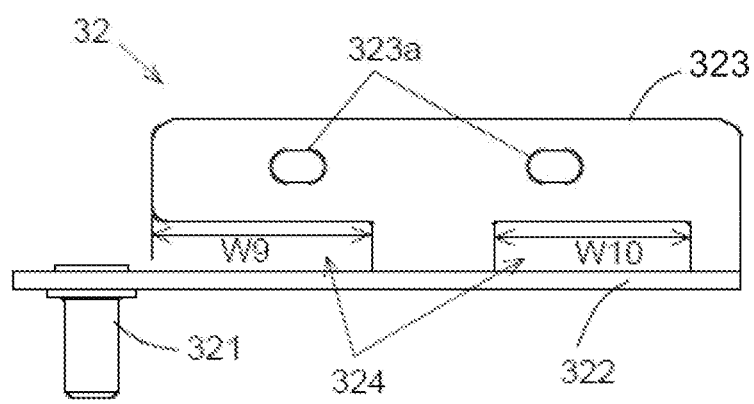
FIG. 23 is a schematic front view of the second hinge of the hinge device according to the third embodiment of the present invention.

FIG. 22 is a schematic top view of the second hinge 32 of the hinge device 113 according to the third embodiment of the present invention. FIG. 23 is a schematic front view of the second hinge 32 of the hinge device H3 according to the third embodiment of the present invention. As illustrated in FIG. 22 and FIG. 23, the second hinge 32 has a second turning shaft portion 321, a second supporting portion 322, and a second mounting portion 323.

The second turning shaft portion 321, which extends in the up-down direction, is similar in configuration to the second turning shaft portion 121 of the first embodiment, and thus a detailed description thereof will be omitted. The second supporting portion 322, which extends in the front-rear and left-right directions, is different in shape from the second supporting portion 122 of the first embodiment. However, the shape of the second supporting portion 322 may be changed as necessary, and thus may be similar to that in the first embodiment. The second supporting portion 322 supports the second turning shaft portion 321 with a structure similar to the structure with which the second supporting portion 122 supports the second turning shaft portion 121 in the first embodiment, and thus descriptions thereof will be omitted.

The second mounting portion 323 extends upward from a rear end portion of the second supporting portion 322. The second mounting portion 323 has a flat surface that is parallel to the mounting surface 109, and is secured to the mounting surface 109. The second mounting portion 323, which is constituted of the same member as the second supporting portion 322, is obtained by bending a portion projecting from the second supporting portion 322.

In the present embodiment, the second mounting portion 323 is provided in a range, in the left-right direction, from a right end of the second supporting portion 322 to a position that is slightly closer to the right end than a left end of the second supporting portion 322 is. The second mounting portion 323 is a plate-shaped portion that is substantially rectangular in plan view as seen from the front. The second mounting portion 323 has two second long holes 323a formed therein, which are disposed with a space therebetween in the left-right direction. The second long holes 323a have the same shape, and are disposed for the same purpose, as in the first embodiment.

The second hinge 32 has two second opening portions 324 each provided astride the second supporting portion 322 and the second mounting portion 323. Specifically, the two second opening portions 324 are disposed with a space therebetween in the left-right direction, and different from each other in shape. A right side one of the second opening portions 324 is hole-shaped, while a left side one of the second opening portions 324 is cut-shaped with a left end thereof open. The second opening portions 324 are formed, for example, by pressing a sheet metal member before the sheet metal member is bent to form the second mounting portion 323. In the present embodiment, the second opening portions 324 are obtained by forming a substantially rectangular through hole and a substantially rectangular cut in the sheet metal member.

As illustrated in FIG. 17 to FIG. 19, as in the hinge device H1 of the first embodiment, in the hinge device H3, the first supporting portion 312 is disposed over the second supporting portion 322. By means of the existence of the first opening portion 314 and the second opening portions 324, the first hinge 31 and the second hinge 32 have crossing portions C3.

In the state where the first supporting portion 312 is disposed over the second supporting portion 322, the first portion 3131 is inserted in the left-side second opening portion 324 and the second portion 3132 is inserted in the right-side second opening portion 324. Thereby, the first mounting portion 313 is disposed below the second supporting portion 322. Furthermore, the second mounting portion 323 is disposed above the first supporting portion 312.

Here, in the present embodiment, the width of the first portion 3131 in the left-right direction is greater than a width of the left-side second opening portion 324 in the left-right direction. However, since a left end portion of the left-side second opening portion 324 is open, it is possible to insert the first portion 3131 in the left-side second opening portion 324. Furthermore, the width of the second portion 3132 in the left-right direction is smaller than a width of the right-side second opening portion 324 in the left-right direction. The first mounting portion 313 and the second mounting portion 323 are mounted on the mounting surface 109, as illustrated in FIG. 18 and FIG. 19, with rear surfaces of the first and second mounting portions 313 and 323 substantially flush with each other.

In assembling the refrigerator 100, for example, after the freezer-compartment door 106 is mounted on the cabinet 101, the cold-storage-compartment door 104 is mounted on the cabinet 101. The second hinge 32 has the second mounting portion 323 extending upward. With this configuration, in mounting the freezer-compartment door 106, even with the freezer-compartment door 106 in its closed position, it is possible to adjust the position of the door 106 in the left-right direction while keeping the second mounting portion 323 visible. This makes it possible to carry out the positional adjustment of the freezer-compartment door 106 efficiently without relying on experience or intuition.

With the second hinge 32 secured to the mounting surface 109 with a fastener (such as a bolt, for example), it is possible to combine the first hinge 31 with the second hinge 32 by means of the first opening portion 314 and the second opening portions 324. The first hinge 31, when combined with the second hinge 32, has the first mounting portion 313 extending downward. With this configuration, in mounting the cold-storage-compartment door 104, even with the cold-storage-compartment door 104 in its closed position, when the freezer-compartment door 106 is kept open, it is possible to adjust the position of the door 104 in the left-right direction while keeping the first mounting portion 313 visible. This makes it possible to carry out the positional adjustment of the cold-storage-compartment door 104 efficiently without relying on experience or intuition.

In addition, the hinge device H3 of the third embodiment offers advantages similar to those offered by the hinge device H1 of the first embodiment. Furthermore, in the hinge device H3 of the third embodiment, the space in the left-right direction between the two long holes 313a respectively formed in the first mounting portion 313 and the second mounting portion 323 can be made wider than in the hinge device H1 of the first embodiment.

Here, in the hinge device H3 of the third embodiment, in plan view as seen in the up-down direction, the first mounting portion 313 has a portion overlapping with the second mounting portion 323. The overlapping portion entirely continuously connects with the first supporting portion 312. Even when the second hinge 32 is secured to the mounting surface 109, since the first mounting portion 313 is allowed to pass through the second opening portions 324, it is possible to pull out the first hinge 31 upward.

It is preferable that a width W4 of the second opening portions 324 in the front-rear direction be greater than a sum of a width W5 of the first mounting portion 313 in the front-rear direction and a width W6 of the second mounting portion 323 in the front-rear direction (see FIG. 19). Moreover, it is preferable that the width W4 of the second opening portions 324 in the front-rear direction be greater than a sum of the width W5 of the first mounting portion 313 in the front-rear direction, the width W6 of the second mounting portion 323 in the front-rear direction, and a length W7 indicated by a broken line in FIG. 19 by which a fastener F (such as a bolt, for example) projects frontward from the second mounting portion 323. With such a configuration, it is easier to pull out the first hinge 31 while avoiding contact with the second hinge 32 or with the fastener F securing the second hinge 32. In the present embodiment, the width W5 of the first mounting portion 313 in the front-rear direction and the width W6 of the second mounting portion 323 in the front-rear direction are equal to each other.

In the hinge device H3 of the third embodiment, in plan view as seen in the up-down direction, the second mounting portion 323 has a portion overlapping with the first mounting portion 313. Part of the overlapping portion is spaced from the second supporting portion 322 by the existence of the second opening portions 324, and thus does not continuously connect with the second supporting portion 322. It is impossible to pull out the second hinge 32 downward with the first hinge 31 secured to the mounting surface 109, because the first hinge 31 is interfered with by the second hinge 32. In order to make the downward pulling-out possible, the configuration may be modified such that, in plan view as seen in the up-down direction, the second mounting portion 323 does not overlap with the first mounting portion 313, or, such that the second mounting portion 323 has a portion that overlaps with the first mounting portion 313 and that entirely continuously connects with the second supporting portion 322.

Furthermore, in the third embodiment, as a preferable configuration, a width W8 of the first opening portion 314 in the left-right direction is smaller than a sum of widths (W9+W10) of the second opening portions 324 in the left-right direction. This configuration is preferable, because it allows the first mounting portion 313 to have an increased width in the left-right direction in the first hinge 31, which receives a greater load than the second hinge 32.

Figure 24:
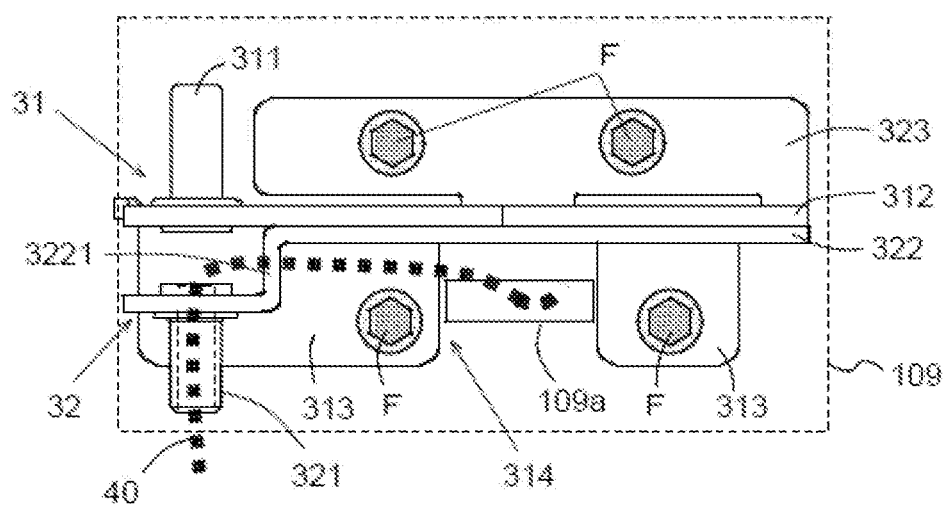
FIG. 24 is a schematic front view of a modified example of the hinge device according to the third embodiment of the present invention.

FIG. 24 is a schematic front view of a modified example of the hinge device H3 according to the third embodiment of the present invention. This modified example has a configuration where the second supporting portion 322 of the second hinge 32 has a step structure. Specifically, the step structure is achieved by lowering a portion of the second supporting portion 322, the second turning shaft portion 321 being provided in the portion. The second turning shaft portion 321 is a hollow shaft. The mounting surface 109 has an opening 109a which overlaps with the first opening portion 314. A wire 40 is drawn through the opening 109a to reach the second turning shaft portion 321 via the first opening portion 314 and a through hole (not shown) provided in a wall portion 3221 which extends in the up-down direction to constitute the step. The wire 40 is led to pass through an inside of the second turning shaft portion 321 to a predetermined place. In the configuration of the present modified example, harness processing is performed by means of the first opening portion 314. In this configuration, it is preferable that the hinge device H3 have a cover for covering the wire 40.

<5. Others>

The configurations of the embodiments and the modified examples described above merely exemplify the present invention. The configurations of the embodiments and the modified examples are appropriately modifiable within a scope that does not depart from the technical idea of the present invention. Furthermore, the plurality of embodiments and the modified example may be implemented in combination within a possible range.

Figure 25:
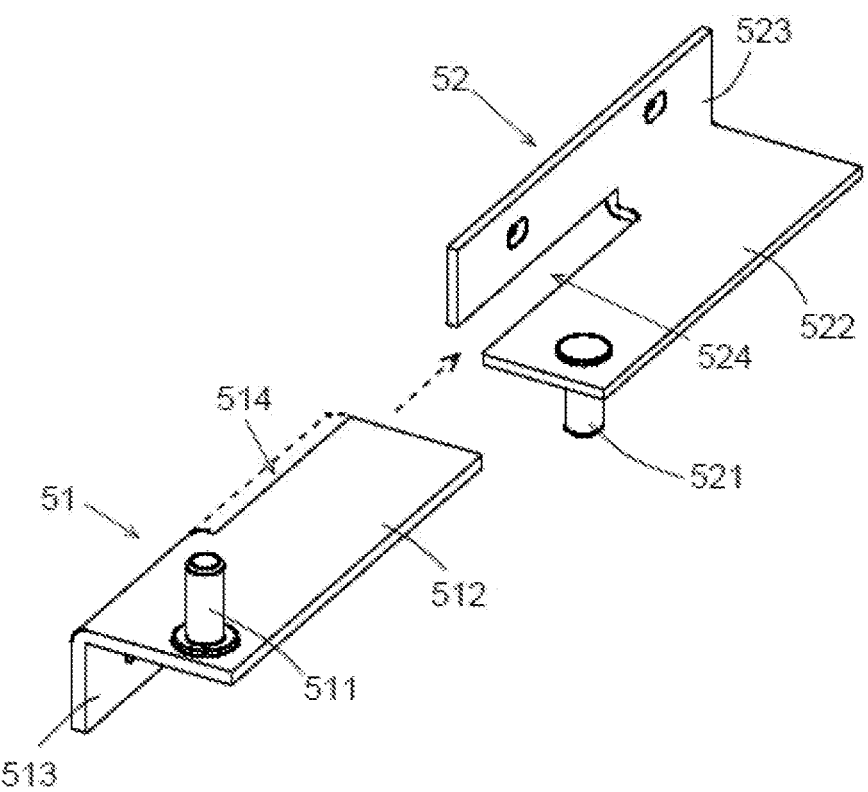
FIG. 25 is a schematic perspective view of still another embodiment of the hinge device of the present invention.

For example, in the above descriptions, the hinge devices H1 to H3 each have a configuration where the first hinge and the second hinge are combined in the up-down direction. However, these configurations are merely examples. FIG. 25 is a schematic perspective view of still another embodiment of the hinge device of the present invention. As illustrated in FIG. 25, the hinge device has a first hinge 51 and a second hinge 52.

The first hinge 51, having a first turning shaft portion 511, has a first opening portion 514 astride a first supporting portion 512 and a first mounting portion 513. The first opening portion 514 extends, in the left-right direction, leftward from a right end to a position beyond a center portion of the first hinge 51. The second hinge 52, having a second turning shaft portion 521, has a second opening portion 524 astride a second supporting portion 522 and a second mounting portion 523. The second opening portion 524 extends, in the left-right direction, rightward from a left end to a position beyond a center portion of the second hinge 52. It is possible to combine the first hinge 51 and the second hinge 52 in the left-right direction by using the two opening portions 514 and 524 to constitute a configuration having a crossing portion. As a result of the combining of the two hinges 51 and 52 with each other, in the hinge device, in a state where the first supporting portion 512 is disposed over the second supporting portion 522, the first mounting portion 513 is disposed below the second supporting portion 521, and the second mounting portion 523 is disposed above the first supporting portion 512.

The application of the hinge device of the present invention is not limited to double doors, but the hinge device of the present invention is applicable also to a single door. Furthermore, without limitation to refrigerators, the hinge device of the present invention is applicable to any storage where two doors are aligned in a direction in which a turning axis extends. Such a storage may be a constituent element of an electric apparatus, for example, or may be a constituent element of a piece of furniture.

LIST OF REFERENCE SIGNS

H1, H2, H3 hinge device
11, 21, 31, 51 first hinge
12, 22, 32, 52 second hinge
100 refrigerator
101 cabinet (mounting target)
104 cold-storage-compartment door (first door)
106 freezer-compartment door (second door)
109 mounting surface
111, 211, 311, 511 first turning shaft portion
112, 212, 312, 512 first supporting portion
113, 213, 313, 513 first mounting portion
121, 212, 312, 512 second turning shaft portion
122, 222, 322, 522 second supporting portion
123, 223, 323, 523 second mounting portion
214 opening portion
314, 514 first opening portion
324, 524 second opening portion
3131 first portion
3132 second portion
C1, C2, C3 crossing portion

The invention claimed is:

1. A hinge device which couples a door to a mounting target to be turnable about a turning axis extending in an up-down direction, the hinge device comprising:
 a first hinge which couples a first door to a mounting surface of the mounting target; and
 a second hinge which couples a second door disposed under the first door to the mounting surface,
 wherein
 the first hinge includes
  a first turning shaft portion which extends in the up-down direction,
  a first supporting portion which extends in a front-rear direction and a left-right direction and supports a bottom of the first turning shaft portion, and
  a first mounting portion which extends downward from a rear end portion of the first supporting portion and is secured to the mounting surface,
 the second hinge includes
  a second turning shaft portion which extends in the up-down direction,
  a second supporting portion which extends in the front-rear direction and the left-right direction and supports a top of the second turning shaft portion, and
  a second mounting portion which extends upward from a rear end portion of the second supporting portion and is secured to the mounting surface, and
 the first supporting portion is disposed over the second supporting portion, the first mounting portion is disposed below the second supporting portion, and the second mounting portion is disposed above the first supporting portion.

2. The hinge device according to claim 1,
 wherein,
 in plan view as seen from front, the first mounting portion which continuously connects with the first supporting portion exists below the first turning shaft portion.

3. The hinge device according to claim 1,
 wherein
 at least one of the first hinge and the second hinge is provided with an opening portion, and an other of the first hinge and the second hinge is inserted in the opening portion to thereby form a crossing portion.

4. The hinge device according to claim 3,
 wherein
 the opening portion is provided astride the first supporting portion and the first mounting portion or astride the second supporting portion and the second mounting portion, and
 the opening portion has a width in the front-rear direction that is greater than a sum of widths of the first mounting portion and the second mounting portion in the front-rear direction.

5. The hinge device according to claim 3,
 wherein
 the first hinge has, as the opening portion, a first opening portion formed in the first mounting portion,
 the second hinge has, as the opening portion, two second opening portions provided astride the second supporting portion and the second mounting portion,
 the first mounting portion has a first portion and a second portion which sandwich the first opening portion therebetween in the left-right direction,
 the two second opening portions are disposed with a space therebetween in the left-right direction, the first portion is inserted in one of the two second opening portions, and the second portion is inserted in an other of the two second opening portions.

6. The hinge device according to claim 1, wherein the first mounting portion and the second mounting portion are spaced apart from each other in plan view as seen along the up-down direction.

7. A storage device comprising the hinge device according to claim 1.

* * * * *